(12) United States Patent
Schmeiser et al.

(10) Patent No.: US 9,555,513 B2
(45) Date of Patent: Jan. 31, 2017

(54) METHOD FOR CHANGING THE UPPER AND LOWER TOOL OF A PACKAGING MACHINE

(75) Inventors: Joerg Schmeiser, Wiggensbach (DE); Gerd Martin Huebner, Wilnsdorf (DE); Klaus Meyer, Breidenbach (DE); Juergen Niesar, Bad Laasphe (DE); Frank Runte, Bad Laasphe (DE)

(73) Assignee: GEA FOOD SOLUTIONS GERMANY GMBH, Biedenkopf-Wallau (DE)

( * ) Notice: Subject to any disclaimer, the term of this patent is extended or adjusted under 35 U.S.C. 154(b) by 896 days.

(21) Appl. No.: 13/580,974

(22) PCT Filed: Feb. 28, 2011

(86) PCT No.: PCT/EP2011/000971
§ 371 (c)(1),
(2), (4) Date: Oct. 19, 2012

(87) PCT Pub. No.: WO2011/104036
PCT Pub. Date: Sep. 1, 2011

(65) Prior Publication Data
US 2013/0212988 A1 Aug. 22, 2013

(30) Foreign Application Priority Data
Feb. 26, 2010 (DE) .................. 10 2010 009 536

(51) Int. Cl.
*B23Q 3/155* (2006.01)
*B65B 7/16* (2006.01)
(Continued)

(52) U.S. Cl.
CPC .............. *B23Q 3/1552* (2013.01); *B65B 1/02* (2013.01); *B65B 7/164* (2013.01); *B65B 9/04* (2013.01);
(Continued)

(58) Field of Classification Search
CPC .......... B29C 33/30; B29C 51/00; B29C 51/20; B29C 51/26; B29C 51/30; B29C 33/305; B29C 31/006; B23Q 3/00; B23Q 3/1552; B23Q 3/155; B65B 47/00; B65B 47/10; B65B 7/164; B65B 7/2878; B65B 59/04; B65B 47/04; B65B 65/00; Y10T 483/1729; Y10T 483/1731; Y10T 483/18; Y10T 483/10; B21D 37/145; B21D 37/147
(Continued)

(56) References Cited

U.S. PATENT DOCUMENTS 3,343,332 A * 9/1967 Mahaffy ................... B65B 9/04
53/433
3,397,508 A * 8/1968 Stroop .................... B29C 51/18
425/398
(Continued)

FOREIGN PATENT DOCUMENTS

DE 9107173 11/1991
DE 102005059312 6/2007
(Continued)

OTHER PUBLICATIONS

International Search report Application No. PCT/EP2011/000971, dated Dec. 23, 2011.
(Continued)

*Primary Examiner* — Hemant M Desai
*Assistant Examiner* — Eduardo R Ferrero
(74) *Attorney, Agent, or Firm* — The Dobrusin Law Firm, P.C.

(57) ABSTRACT

A packaging machine is disclosed that includes a deep-drawing station, a filling station, a sealing station, or a combination thereof. The deep-drawing station, the sealing station, or both have an upper tool including a supporting top (Continued)

part. The supporting top is pivotable via a pivot mechanism, and the pivot mechanism is detachable from the supporting top part.

20 Claims, 7 Drawing Sheets

(51) Int. Cl.
B65B 9/04 (2006.01)
B65B 47/00 (2006.01)
B65B 59/04 (2006.01)
B65B 1/02 (2006.01)
B29C 51/20 (2006.01)
B29C 31/00 (2006.01)
B29C 33/30 (2006.01)

(52) U.S. Cl.
CPC .............. B65B 47/00 (2013.01); B65B 59/04 (2013.01); B23Q 3/155 (2013.01); B29C 31/006 (2013.01); B29C 33/30 (2013.01); B29C 51/20 (2013.01); Y10T 483/10 (2015.01)

(58) Field of Classification Search
USPC ... 53/558, 559, 329.3, 393, 452; 483/28, 29; 264/521, 553
See application file for complete search history.

(56) References Cited

U.S. PATENT DOCUMENTS

| | | | |
|---|---|---|---|
| 3,474,494 A | | 10/1969 | Damm et al. |
| 3,561,057 A | | 2/1971 | Butzko |
| 3,678,562 A | * | 7/1972 | Leibinger .................... 483/1 |
| 3,706,174 A | | 12/1972 | Young et al. |
| 3,815,322 A | | 6/1974 | Wyslotsky |
| 3,841,141 A | * | 10/1974 | Rachwal ...................... 483/28 |
| 3,867,084 A | * | 2/1975 | Miller ........................ 425/383 |
| 3,921,887 A | * | 11/1975 | Maehara et al. ............. 228/155 |
| 3,945,230 A | * | 3/1976 | Tomioka et al. ................. 483/1 |
| 3,958,394 A | | 5/1976 | Mahaffy et al. |
| 3,988,093 A | * | 10/1976 | Birchenough ............ 425/174.4 |
| 4,477,243 A | * | 10/1984 | Wallsten ........................ 425/292 |
| 4,515,546 A | * | 5/1985 | Medwed ........................ 425/195 |
| 4,624,044 A | * | 11/1986 | Bredow et al. ................. 483/29 |
| 4,773,839 A | * | 9/1988 | Case et al. .................... 425/186 |
| 4,846,627 A | * | 7/1989 | Steuart ..................... B65G 1/10 16/35 R |
| 4,867,668 A | * | 9/1989 | Miyairi ............... B29C 45/2673 101/394 |
| 4,883,419 A | * | 11/1989 | Queirel ...................... 425/326.1 |
| 4,932,856 A | | 6/1990 | Merklinghaus et al. |
| 5,170,611 A | * | 12/1992 | Buchko et al. ................ 53/453 |
| 5,401,355 A | * | 3/1995 | Stiller ........................... 156/443 |
| 5,458,057 A | * | 10/1995 | Arens ......................... 100/229 R |
| 5,466,207 A | * | 11/1995 | Arens .............................. 483/28 |
| 5,517,805 A | * | 5/1996 | Epstein .................. B65B 65/02 53/453 |
| 5,619,913 A | * | 4/1997 | Padovani ....................... 100/35 |
| 5,653,934 A | * | 8/1997 | Brun et al. ..................... 264/334 |
| 5,814,261 A | * | 9/1998 | Steckling .............. B29C 31/006 264/297.6 |
| 5,929,760 A | | 7/1999 | Monahan |
| 5,940,953 A | * | 8/1999 | Arends et al. ................. 29/434 |
| 6,000,322 A | * | 12/1999 | To ................................. 100/35 |
| 6,006,505 A | * | 12/1999 | Natterer ........................ 53/559 |
| 6,047,579 A | * | 4/2000 | Schmitz ........................ 72/15.1 |
| 6,200,245 B1 * | | 3/2001 | Dodo et al. ...................... 483/1 |
| 6,497,642 B1 * | | 12/2002 | Simms ............................ 483/1 |
| 6,572,356 B2 * | | 6/2003 | Seger ................... B29C 33/305 425/192 R |
| 6,848,290 B2 * | | 2/2005 | Pyper et al. ............... 72/405.06 |
| 7,204,069 B2 * | | 4/2007 | Liao .............................. 53/510 |
| 7,340,871 B1 * | | 3/2008 | Shackelford et al. ......... 53/453 |
| 8,499,536 B2 * | | 8/2013 | Bonneville ..................... 53/561 |
| 2001/0029225 A1 * | | 10/2001 | Kawamoto et al. ........... 483/29 |
| 2004/0018925 A1 * | | 1/2004 | Harsch ................. B21D 43/057 483/28 |
| 2004/0187443 A1 * | | 9/2004 | Michel .......................... 53/453 |
| 2005/0230873 A1 * | | 10/2005 | Schlosser et al. ............. 264/153 |
| 2006/0027286 A1 * | | 2/2006 | Resterhouse et al. ........ 141/383 |
| 2006/0160684 A1 * | | 7/2006 | Springston et al. ............. 483/1 |
| 2006/0223687 A1 * | | 10/2006 | Hedin ................... B30B 15/028 483/28 |
| 2006/0281613 A1 * | | 12/2006 | Bapst et al. ..................... 483/28 |
| 2007/0012708 A1 | | 1/2007 | Send et al. |
| 2007/0138192 A1 | | 6/2007 | Send et al. |
| 2009/0090084 A1 * | | 4/2009 | Bamberger et al. ......... 53/128.1 |
| 2009/0100804 A1 * | | 4/2009 | Bonneville ..................... 53/453 |
| 2009/0126452 A1 * | | 5/2009 | Toeniskoetter ................ 72/448 |
| 2009/0266028 A1 * | | 10/2009 | Zeller et al. .................... 53/201 |
| 2010/0251666 A1 * | | 10/2010 | Gonzalez et al. .............. 53/201 |
| 2012/0159898 A1 * | | 6/2012 | Muehlschlegel et al. ...... 53/201 |
| 2012/0159901 A1 * | | 6/2012 | Capriotti et al. ............... 53/285 |
| 2012/0289388 A1 * | | 11/2012 | Ehrmann et al. ................ 483/1 |
| 2012/0291400 A1 * | | 11/2012 | Ehrmann .................. B65B 9/04 53/396 |
| 2013/0212988 A1 * | | 8/2013 | Schmeiser et al. ............ 53/558 |
| 2014/0230618 A1 * | | 8/2014 | Streitenberger et al. ......... 83/13 |
| 2014/0366356 A1 * | | 12/2014 | Spary ............................ 29/428 |

FOREIGN PATENT DOCUMENTS

| | | |
|---|---|---|
| EP | 1234765 | 8/2002 |
| EP | 2052979 | 4/2009 |
| EP | 2110219 | 10/2009 |

OTHER PUBLICATIONS

International Preliminary report on Patentability, Application No. PCT/EP2011/000971, dated Feb. 7, 2012.
International Preliminary report on Patentability, Application No. PCT/EP2011/000971, dated Oct. 12, 2012.

* cited by examiner

METHOD FOR CHANGING THE UPPER AND LOWER TOOL OF A PACKAGING MACHINE

CLAIM OF PRIORITY

The present application claims the benefit of the filing date of PCT Application Serial No. PCT/EP2011/000971 (filed Feb. 28, 2011) (Published as WO 2011/104036) and DE 10 2010 009 536.2 (filed Feb. 26, 2010), the contents of which are hereby incorporated by reference in their entirety.

The present invention relates to a method for changing the upper and lower tool of a packaging machine. The present invention further relates to a packaging machine.

Packaging machines are nowadays used to pack contents, in particular food, in a film pack. These packs generally consist of a bottom part and a top part, wherein the bottom part is produced from a lower film and the top part is produced from an upper film, for instance in a shape-out/trough which has been deep-drawn in suitable form. The pack content is located between the upper film and the lower film. Once the pack content has been disposed between the two films, these are sealed together. The films are transported preferably in cycles along the packaging machine, with its function/working stations, and in a cycle a plurality of packs, a so-called format, are generally produced simultaneously. For the deep-drawing or sealing of the film webs, tools, generally consisting of a lower and an upper tool, are required. These tools are individualized for the pack or format which is respectively to be produced, so that they have to be exchanged whenever the pack or size is changed.

Tool changing systems of this type are disclosed, for instance, in EP 1 234 765 B1 and in EP 2 110 219 A1, as well as in U.S. Pat. No. 5,940,953.

The tool changing systems which are therein described axe comparatively complex, however, or do not enable tools to be changed at ergonomically favorable height.

The object of the present invention was therefore to provide a method and a device which do not have the drawbacks of the prior art.

The object is achieved with a method for changing the upper tool and/or the lower tool of a packaging machine, in which at least one, preferably both tools are raised over a disturbing edge of the packaging machine and then removed from the packaging machine, and new tools are delivered above the disturbing edge to the packaging machine.

The present invention relates to a method for changing the tipper tools and/or the lower tools of a packaging machine. These tools can be constituted by the tools of a deep-drawing station and/or of a sealing station. The tools can consist of a plurality of parts which can be designed to be mutually displaceable in the packaging machine.

According to the invention, at least one, preferably both two tools, are now raised for the tool change, for instance by a lifting device, over a disturbing edge of the packaging machine.

A disturbing edge within the meaning of the present invention is a height, in particular above the machine frame, at which one or both tools are freely available to an operator or to an apparatus, for instance a robot and/or a transport means, so that it/they can be removed from the packaging machine. The new tool is also brought above this disturbing edge into a region above the packaging machine and then lowered into the packaging machine. The disturbing edge can coincide with the top edge of the machine frame, in particular at a height which is ergonomically favorable to the on-site worker.

The lower and upper tool of the deep-drawing or sealing station can be changed jointly or individually.

In particular, the respective tool is delivered at an ergonomically favorable height, so that the particular person who changes the respective tool at least no longer has to significantly raise and/or lower this, but only has to laterally displace or remove it.

Preferably, the tools, in particular of a working station, i.e. of the forming or scaling station, are raised or lowered at least in sections jointly, in particular with a common drive, wherein, of course, the upper tool has to be raised or lowered by a lesser distance than the lower tool. This preferred embodiment of the present invention has the advantage that only one drive is required for both tools in connection with the tool change. Several, for example two or four individual drives per working station, which can preferably be coupled electrically/electronically and/or mechanically to one another, are also possible however.

The tools of the forming station are preferably changed separately from the tools of the sealing station.

Preferably, the tool or tools is/are raised and lowered vertically.

For the changing of a tool, it may foe necessary for it to be laterally displaced. Preferably, this lateral movement is made in or counter to the running direction of the film web. Particularly preferably, the tool is laterally displaced by at least one format length (feed of the film web in a cycle, also referred to as the cycle length), i.e. the length by which the film is transported onward in a cycle.

In a preferred embodiment of the method according to the invention, the lower tool is disposed on a lifting table and the upper tool is disposed on a supporting top part. Preferably, at least one tool is automatically unlocked from and/or locked to the lifting table or from/to the supporting top part before and after the tool change. Automatically unlocked/locked within the meaning of the invention signifies that a, preferably mechanical, locking, a power, vacuum, compressed air, coolant, cleaning fluid and/or inert gas connection is realized automatically, i.e. without human involvement. Hereafter, additional assembly tools are not necessary for the tool change.

Film web within the meaning of the invention signifies that it consists at least partially of plastic, but can also have a paper component or the like.

Preferably, in the packaging machine at least one film web, in particular the lower film web, is transported along a film transport plane. This transport can be realized continuously. Preferably, the transport is realized, however, in cycles wherein the film web is transported onward by one format length in each cycle. Preferably, the film web is constituted by the lower film or by the upper film. According to a preferred embodiment, this film web is cut open for the tool change, wherein, quite especially preferably, one format length is cut out of the film web or film webs, so that the lower tool can be lifted through this cutout over the disturbing edge. Preferably, the cutout of the film web or film webs is realized such that at least one margin, preferably both margins, of the film web which is gripped by a transport means, in particular two transport chains disposed to the right and left of the film web, is/are left in place, so that the film web(s), after the tool change, can be transported onward. By the margins of the film web is understood, by the person skilled in the art, that region of the film which protrudes respectively to right and left beyond the format. This region is generally respectively gripped by a transport chain.

According to a preferred embodiment, the packaging machine has a supporting top part, to which the upper tool to be changed is connected. Preferably, this supporting top part is designed such that, for the tool change, it can be moved away, in particular swung away, turned away, pushed away and/or moved, at least in sections, translationally. This preferred embodiment of the present invention has the advantage that, as a result of this away movement, the upper tool to be changed is freely accessible from above. According to a further preferred or inventive embodiment of the present invention, this away movement of the tool can also be used for a tool inspection and/or a tool cleaning.

According to another preferred embodiment of the present invention, in the event of a change in the feed of the film web in a cycle (cycle length), only the tools are changed. The position of the forming and/or sealing station within the packaging machine preferably remains unaltered, but can still be additionally adapted. The tools are here designed in their basic structure preferably for a long feed length and, in the case of smaller formats, only the working region of the tools which is in engagement with the respective film web is reduced.

According to another preferred embodiment of the present invention, in the event of a change in the feed of the film web in a cycle (cycle length), the total length of the tool is adapted to the respectively desired feed. In this case, apart from the tool itself, also the base plate, which connects the tool to the lifting system, must be exchanged. Preferably, the base plate is here likewise lifted over the disturbing edge, and/or, after the tool change, lowered at least in sections to back below the disturbing edge, and/or the base plate is automatically unlocked and/or locked before and after the tool change.

Preferably, in the event of a tool change, the position of the respective working station within the packaging machine is also adapted. This can be done before, during or after the tool change. The position of the respective working station (for example forming, filling, sealing and/or separating station) can here be adapted, for instance, to as altered feed of the film web per cycle. The working stations, in the event of a change in their position, are displaced preferably along the frame of the packaging machine and then detained in their new position. The displacement can be realized manually or by motor, in particular automatically, in particular on the basis of an identification label present on the tool.

In another preferred embodiment, the respective tool is identifiable with an identification means/tag, for instance with RFID. This preferred embodiment has the advantage, for instance, that the packaging machine, once the respective tool has been identified, is automatically adaptable to the respective tool. For instance, the identification can be used to establish which connections (power, compressed air, inert gas, etc.) must be provided. Furthermore, the movement of the tool, i.e. in particular the movement of the lifting table, can be adapted to the respective tool in order to prevent the packaging machine from being damaged by too large a stroke or prevent the tool stroke from being too small. In addition, on the basis of the identification label, it is possible to establish how the tool change is to be made, for instance at what height the respective tool is to be lifted. A transport means which takes over the tool after the change can also be controlled automatically on the basis of the identification label. With the identification means, moreover, it is possible to prevent the use of an incorrect tool which is not designed for the respective packaging machine. In this case, a control system provided in the packaging machine will preferably prevent possible starting of the packaging machine. The same preferably applies if the control system detects that non-harmonized tools are clamped in place in one of the working stations, preferably in the deep-drawing and/or sealing station.

All statements made according to the invention apply equally to the packaging machines according to the invention, and vice versa.

A further subject of the present invention is a packaging machine having a deep-drawing, filling and sealing station, wherein the deep-drawing and the sealing station respectively have an upper tool having a supporting top part, wherein at least one supporting top part is designed to be pivotable and the pivot mechanism is detachable from the supporting top part.

Yet another or preferred subject of the present invention is a packaging machine in which the deep-drawing and/or the sealing station respectively have a lifting device, wherein this lifting device is used also to raise and lower the lower and/or upper tool to above or below the disturbing edge.

Yet another inventive or preferred subject of the present invention is a packaging machine which has height-adjustable, preferably telescopic, guide rails for one or more tools. These guide rails can be used for the tool change to transfer the respective tool from a parking position into the usage position, and vice versa. Preferably, these guide rails are not constituted by a continuous plane, but by rails provided to the right and left of the respective tool.

According to a further inventive or preferred subject of the present invention, the packaging machine has a product support, which is designed to be height-adjustable and/or is part of a lifting device for the tool change. Product supports of this type are means which are provided parallel to the transport direction of the film web and are disposed between respectively two packs and which prevent excessive sagging of the film web transversely to its transport direction. Product supports of this type are particularly required once the respective pack has been filled with the pack content.

According to yet another or preferred subject of the present invention, the packaging machine has a plurality of forming or sealing stations, wherein the forming stations and/or sealing stations preferably have respectively different tools. For instance, they have two forming and two sealing stations, which respectively have tools for different draws, for instance 370 mm and 400 mm. These tools can then be used, for instance, selectively, simultaneously or separately, without the need for a tool change. If, on the other hand, the tools are changed, then the tools to be used are preferably respectively inserted in the station having the corresponding draw, i.e. tools with 370 mm draw, for instance, in the station set up for 370 mm draw.

A further or preferred subject of the present invention is a packaging machine which has a means that can be brought into engagement with a corresponding means on a transport means and that defines the position of the transport means relative to the packaging machine in at least two, preferably three spatial directions. With the transport means, the tools are transported to the packaging machine and away from this.

This inventive embodiment of the present invention has the advantage that a transport means can be brought into a position which is clearly defined relative to the packaging machine, for instance to its frame and/or the disturbing edge, and in which position one or more tools can be received and/or delivered. This means cooperates with a means provided on the transport means. Preferably, the two means are realized such that they are self-finding. For instance, one of the means is a truncated cone and the other means is a tapered recess into which the truncated cone is introduced. As a result, the two means are clearly defined relative to each other in at least two, if necessary even three spatial directions, and this system is self-finding. Preferably, via these two means, a further energy transfer is also made to the transport means, with which the respective tool can be moved by motor.

With the transport means, the tool(s) delivered at an ergonomically favorable height by the above-described method or the above-described packaging machine can be delivered, for instance pushed or pulled, to the transport means manually or by motor. In this context, the following alternatives are conceivable:

a. There are two separate transport means: one for receiving the tool and one for delivering the tool. The tool to be changed is loaded onto the transport means and this is moved away from the packaging machine. Another transport means is docked to the packaging machine and delivers a new tool.

b. The transport means already contains the changeover tool, for example in another plane and/or in the same plane but offset. Following the reception of a tool from the packaging machine, the changeover tool is brought into the delivery position and delivered to the packaging machine.

c. The transport means contains all tools to be changed of one or more working stations of the packaging machine.

The transport means and/or the packaging machine preferably have a means with which the lateral distance between the transport means and the packaging machine can be bridged. The means in question can here be constituted, for instance, of telescopic rods and/or a laterally displaceable delivery table. The transport means can also bridge the distance by a pivotal and/or rotary movement.

Preferably, the respective tool and/or the transport means is also designed such that the tool take-up/delivery takes place automatically. For this purpose the tool has an identification label, on the basis of which the transport means, at least the tool reception and delivery, is realized automatically. The transport of the transport means toward the packaging machine and away therefrom can be realized manually or by motor or automatically.

The inventions are elucidated below with reference to FIGS. 1 to 7. These elucidations are purely exemplary and do not restrict the general inventive concept. These elucidations apply to all subjects of the present invention equally.

Figure 1:
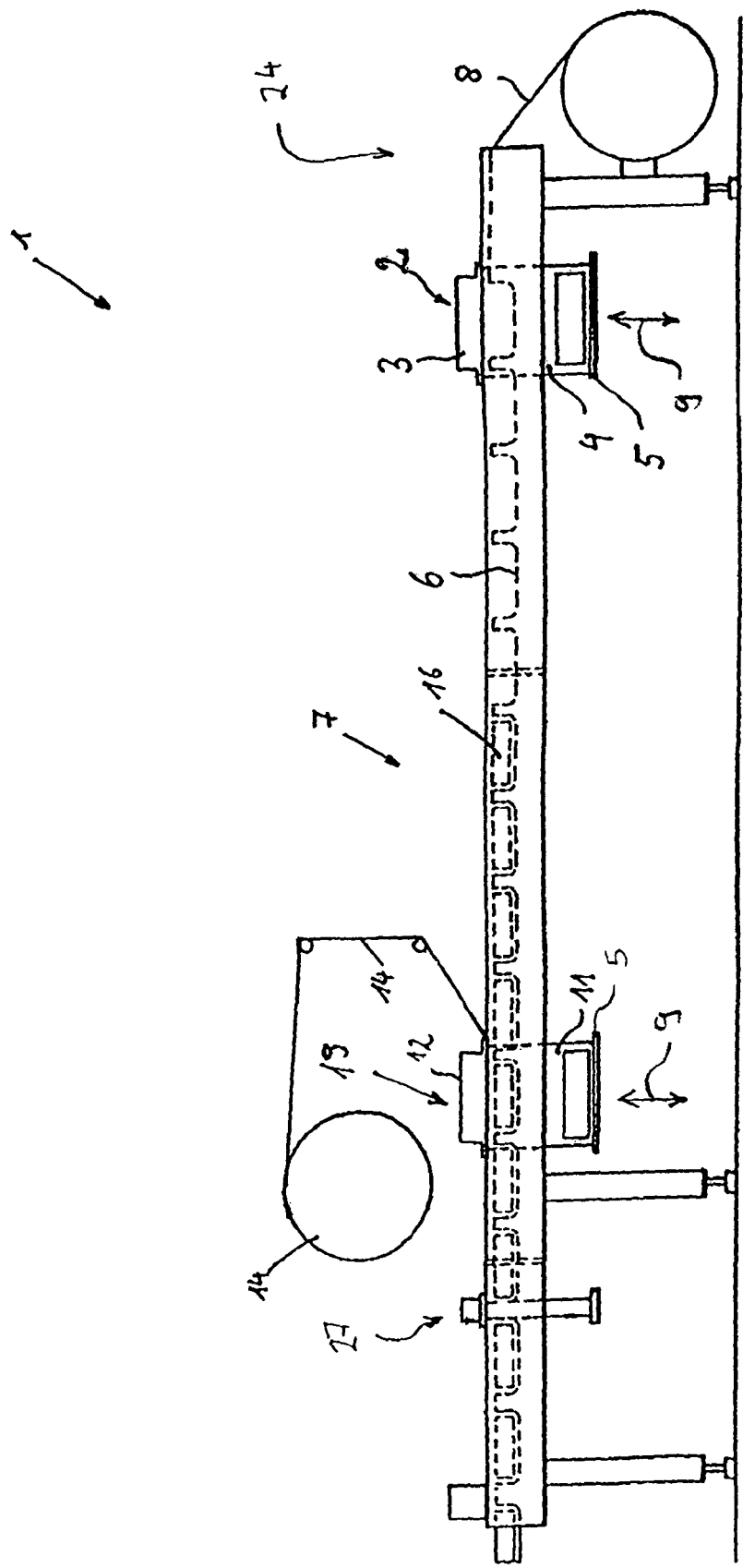
FIG. 1 shows a packaging machine.

FIG. 1 shows the inventive packaging machine 1, which has a deep-drawing station 2, a filling station 7 and a sealing station 19. A plastics film web 8, the so-called lower web, is drawn off from a supply roller and is transported from right to left along the inventive packaging machine, preferably in cycles. In a cycle, the film is transported onward by one format length. In the application, this is also referred to as "feed of the film web in a cycle". For this purpose, the packaging machine has two transport means (not represented), in the present case respectively two endless chains, which are disposed respectively to the right and left of the film web. Each endless chain has holding means, which respectively cooperate with the edges of the film web. Both at the start and at the end of the packaging machine, a gearwheel is respectively provided for each chain, around which gearwheel the respective chain is diverted. At least one of these gearwheels is driven. The gearwheels in the inlet region and/or in the outlet region can fee connected to each other, preferably by a rigid axle. Each transport means has a multiplicity of clamping means, which clampingly grip the lower film in the inlet region and transmit the movement or the transport means to the lower film. In the outlet region of the packaging machine, the clamping connection between the transport means and the lower film is released again. In the deep-drawing station 3, which possesses an upper tool 3 and a lower tool 4, which has the shape of the pack trough to be produced, the pack troughs 6 are shaped in the film web 8. The lower tool 4 is disposed on a lifting table 5, which, as is symbolized by the double arrow, is vertically adjustable. Prior to each film feed, the lower tool 4 is lowered and subsequently raised again. In the further course of the packaging machine, the pack troughs are then filled in the filling station 7 with the pack content 16. In the adjoining sealing station 19, which likewise consists of an upper tool 12 and a vertically adjustable lower tool 11, an upper film is sealed onto the pack trough. In the sealing station also, the upper tool and/or the lower tool are lowered and raised before and after each film transport. The upper film 14, too, cars be guided in transport means or be transported by transport chains, in which case these transport means extend only from the sealing station and, if necessary, downstream. Otherwise, the statements made about the transport means of the lower film apply. In the further course of the packaging machine, the finished packs are also separated, which is realized with the cutting tool 27.

Figure 2:
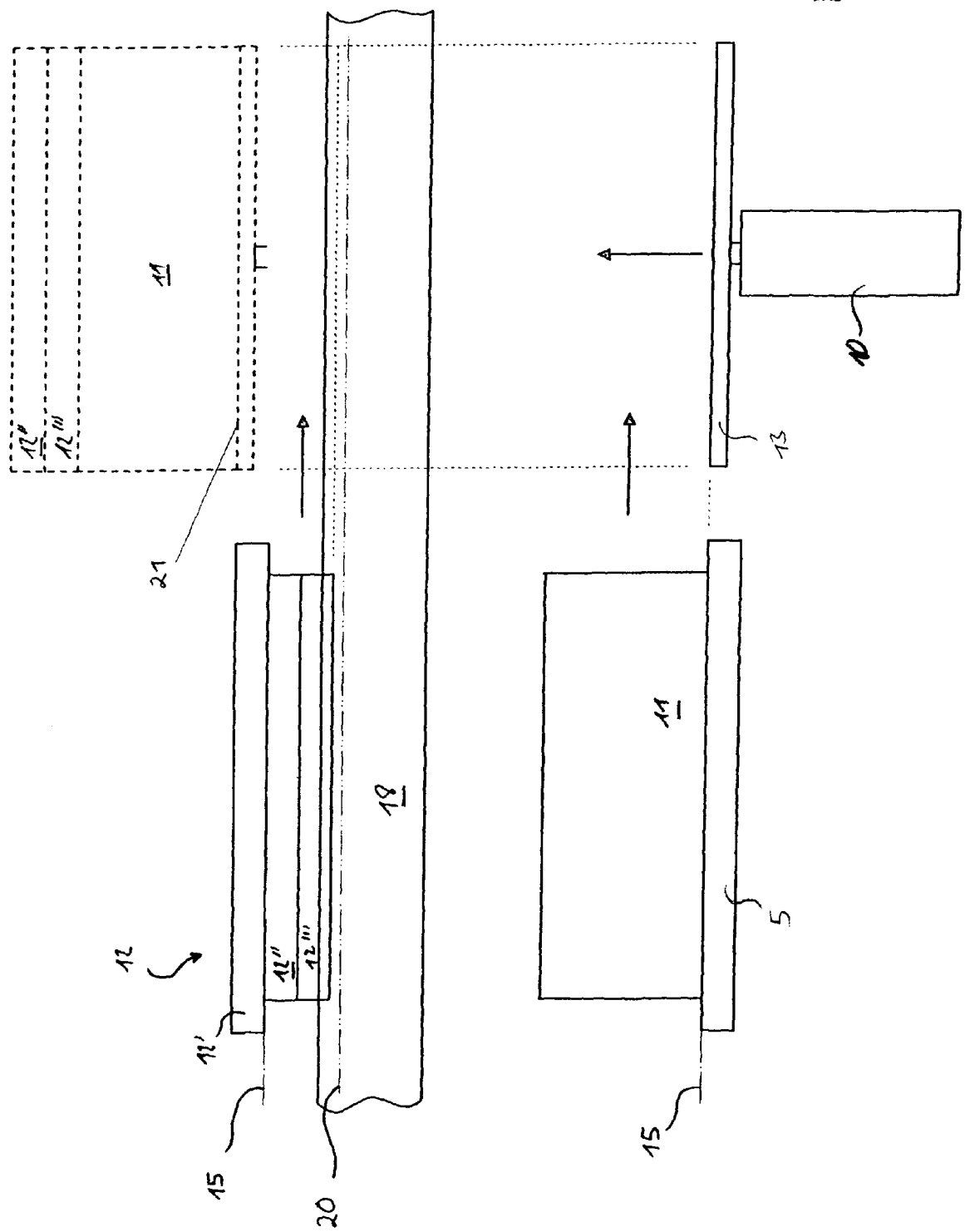
FIG. 2 shows a first embodiment of the method according to the invention.

FIG. 2 shows the sealing station of the packaging apparatus according to the invention, wherein the following statements, according to FIGS. 2 to 7, apply analogously to the deep-drawing station. A machine frame 18, along which filled packs are transported from right to left or from left to right in a film plane 20, can be seen, which packs are closed off in the sealing station with an upper film. The sealing station has an upper tool 12 and a lower tool 11. The upper tool 12 consists of a supporting top part 12', on which is disposed a sealing frame 12", as well as a chamber cover 12'''. Preferably, the sealing frame 12" is designed to be movable relative to the chamber cover. The sealing frame 12" and the chamber cover 12''' are hereinafter referred to as tools, which are separated from the supporting top part 12' along a parting plane 15 and can thus be exchanged. Beneath the film plane is provided a sealing bottom part 11, which has, for instance, a sealing gland. This tool 11 is fixed to a lifting table 5, with which it can be moved up and down, yet can also be separated from this along the parting plane 15 and thus exchanged. For a tool change, the tools 12', 12''' and 11 to be changed are first of all brought into their tool change position. Next the tools 12', 12''' are separated as a unit from the supporting top part 12'. This is realized manually, though preferably automatically. After this, the tool 12', 12''' is brought, preferably lowered, onto a receiving unit, for instance slide bar, either by free fall over a short distance, or automatically guided. Furthermore, the film is opened in the region above a lifting device 10, for instance by a hole being cut with a knife in the film web, which hole is sufficiently large to allow the lower tool to be guided through this hole. Regions of the film (lateral strips) here remain intact, so that the film in some regions remains continuous and the force flux in the transport of the film is not fully interrupted. Rethreading of the film in the subsequent process development is thereby dispensed with. Furthermore, the lower tool 11 is unlocked from the lifting table 5 either manually or automatically. Next the lower tool 11 is displaced either manually or automatically by at least one format length counter to or in the running direction of the machine, wherein the tool 11 is delivered to a take-up system, which can be a component part of the existing lifting device, yet can also constitute a separate lifting device 10. The upper tool 12", 12'" is also displaced in or counter to the running direction of the machine, wherein the tools 12", 12'" and 11 are preferably displaced in the same direction. This tool 12', 12'" is also displaced either manually or automatically by at least one format length of the film and the tool 12', 12'" is delivered to a take-up system, preferably the same take-up system as the lower tool 11. The lower tool 11 and the upper tool 12", 12'" are then raised, preferably in a motionally combined manner, over the disturbing edge, that is to say at least over the machine frame 18 of the packaging machine, and can from there be taken up at an ergonomic height by hand or by a machine system.

Figure 3:
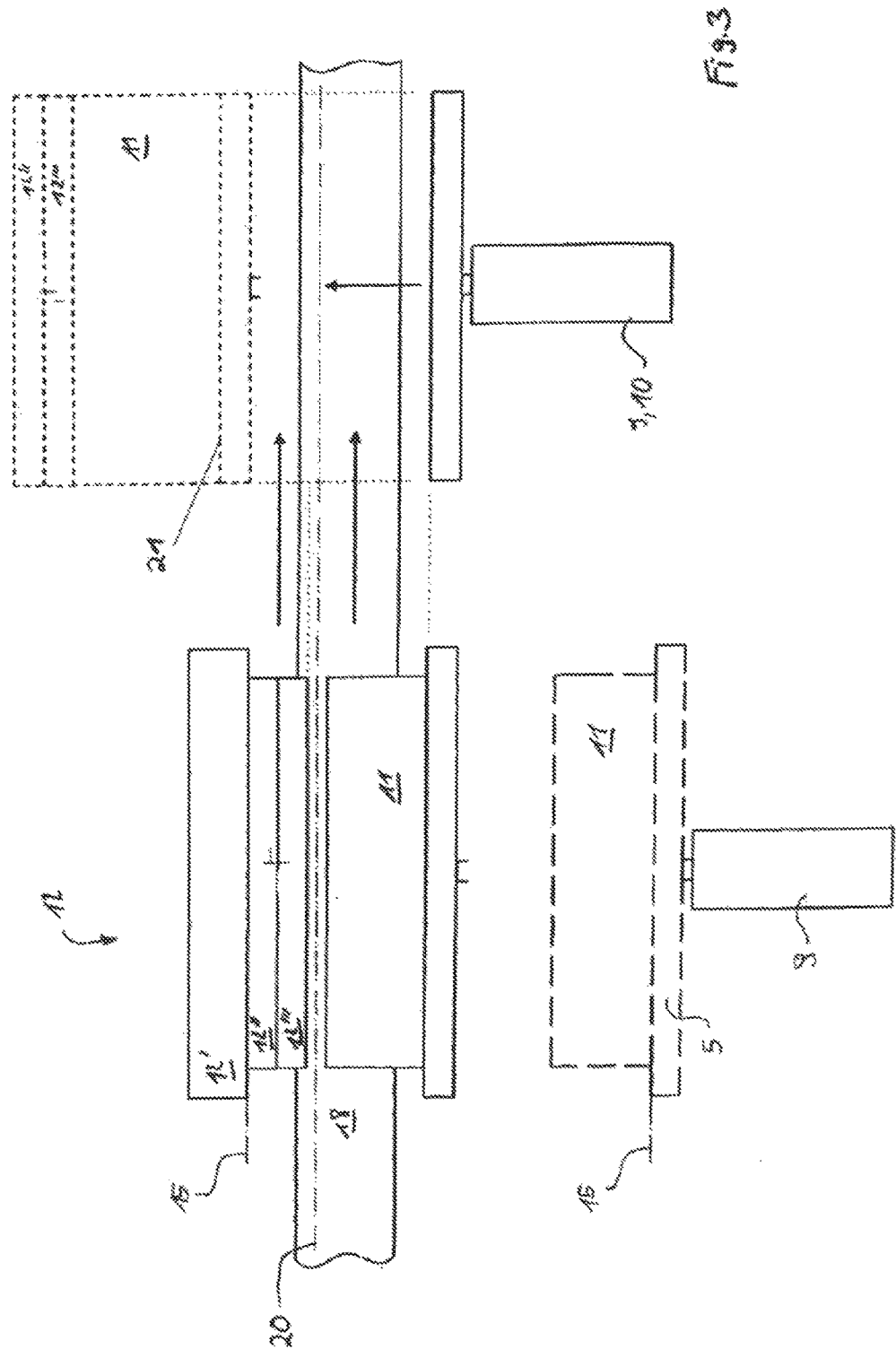
FIG. 3 shows a further embodiment of the method according to the invention.

FIG. 3 shows a further embodiment of the method according to the invention. The statements relating to FIGS. 1 and 2 apply equally to the method according to FIG. 3, wherein, in the present case, the two tools are raised jointly by the lifting device 10. The lifting device can be the lifting device which is anyway present or an additional lifting device. Insofar as product supports (not represented) are present, these must be removed or integrated into the additional lifting device 10. Prior to the joint raising with the lifting device 10, the lower tool 11 can be brought with the generally present lifting device 9 into a, in this case elevated tool change position closely below the lower film in order, for instance, to allow the lifting device 10, by virtue of the elevated application position, to be equipped with a smaller stroke measure, whereby, for instance, the installation space can be reduced and material saved.

Figure 4:
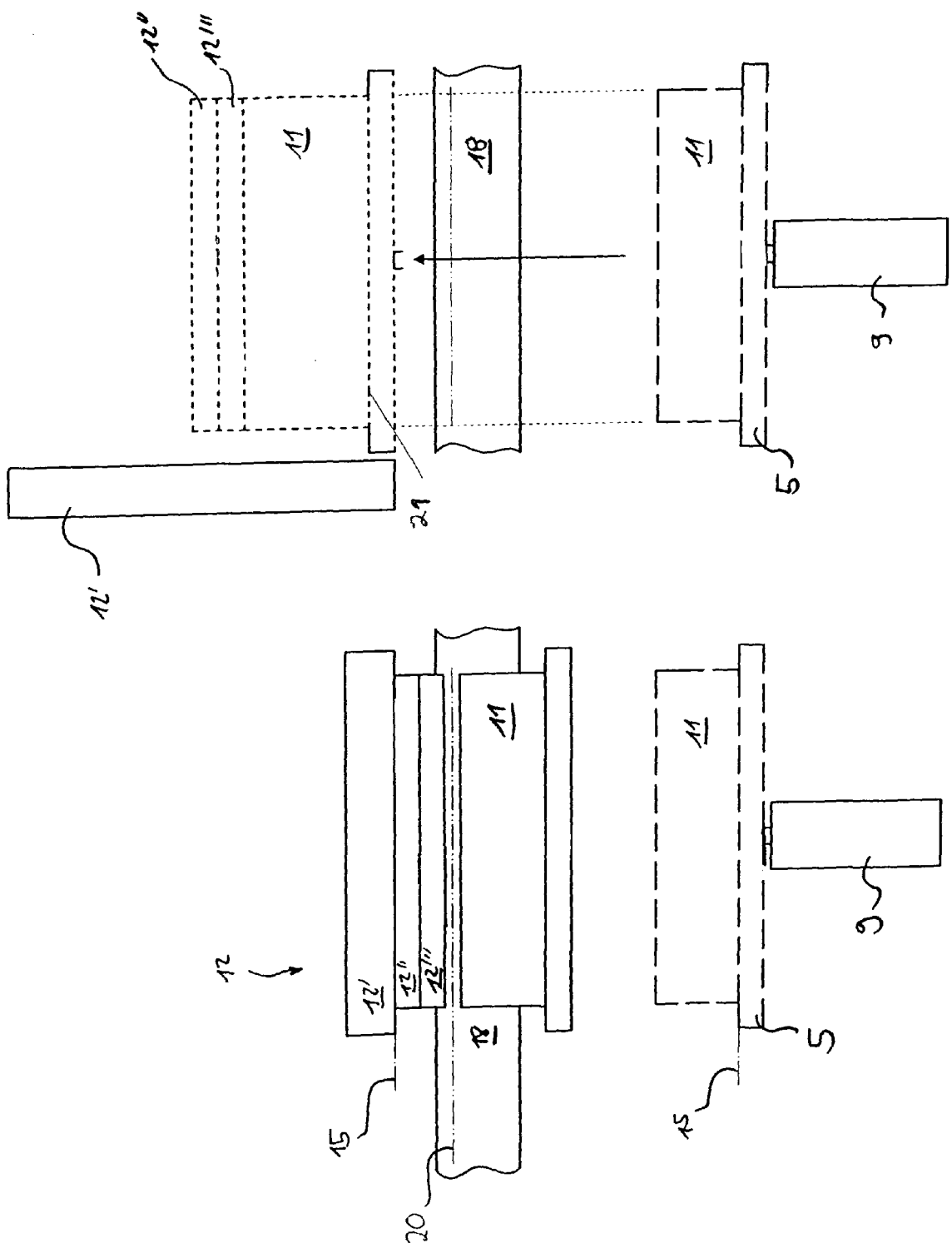
FIG. 4 shows a third embodiment of the method according to the invention.

FIG. 4 shows a further variant of the method according to the invention. In this variant also, reference is made to the previous method descriptions according to FIGS. 1-3. This variant has as a peculiarity that the lifting device 9 which is needed for the up and down movement in the sealing of the film is also used for the tool change. With this lifting device 9, at least the lower tool 11, preferably, however, the lower tool 11 and the upper tool 12", 12'", is/are raised jointly beyond the disturbing edge 21. Furthermore, this embodiment of the apparatus according to the invention and of the method according to the invention has a pivotable, supporting top part 12', which can be pivoted from a substantially horizontal into a substantially vertical alignment. The region above the tool 12" or 12'" is thereby completely free. Alternatively, the supporting top part 12' car additionally or solely be laterally displaced in order to liberate the region above the tool 12" and 12'".

Figure 5:
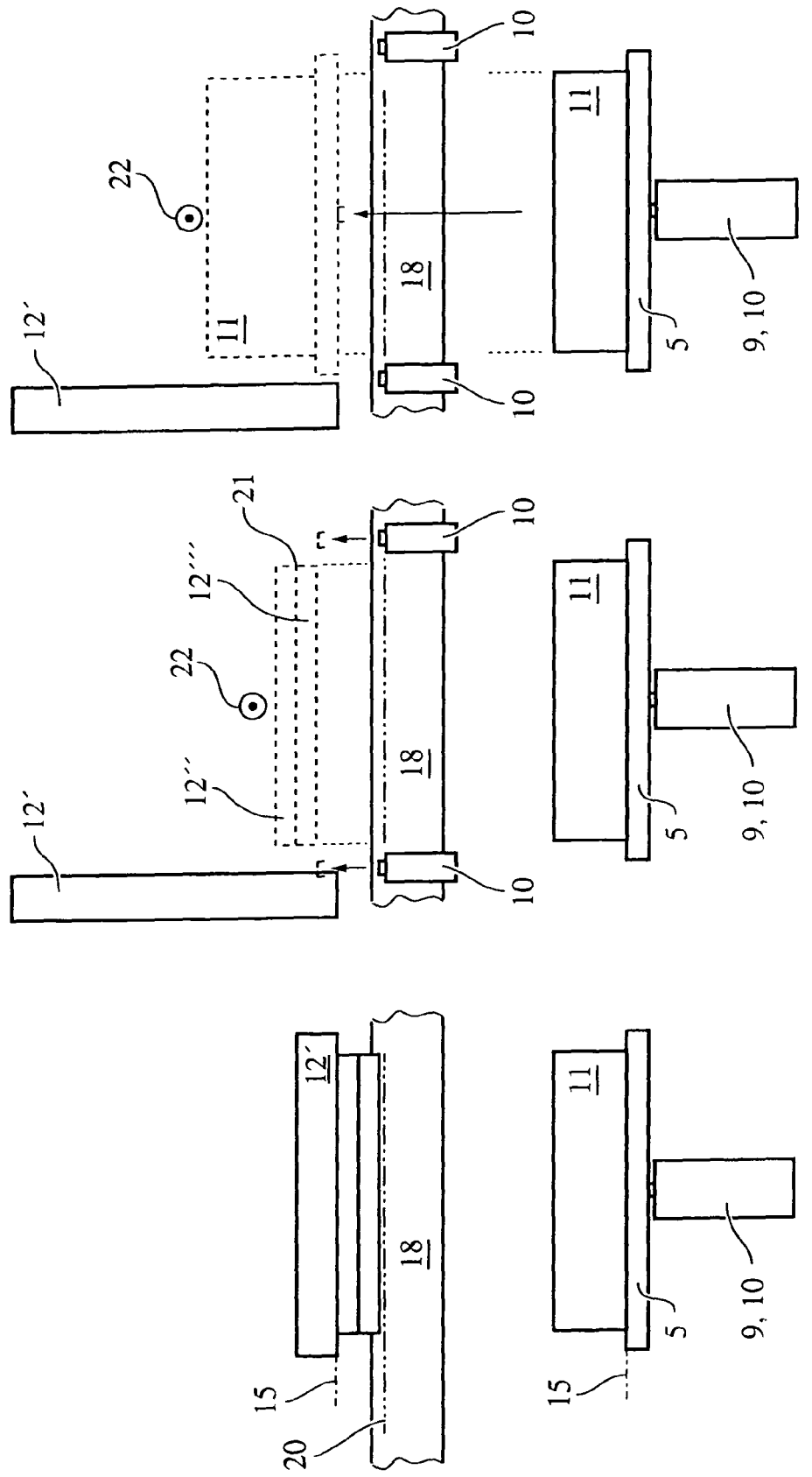
FIG. 5 shows yet another embodiment of the method according to the invention.

FIG. 5 shows yet another embodiment of the method according to the invention, wherein, here too, reference is made to the description according to the preceding figures. In this version too, the supporting top part 12', for a tool change, is transferable and/or laterally displaceable from a horizontal into a vertical position. In this variant, the upper tool 12", 12'" is initially raised, and removed horizontally, as symbolized by the arrow 22, from the machine by a horizontal movement roughly transversely to the transport direction of the film. Next the lower tool 11 is raised over a disturbing edge 21 and can likewise be displaced horizontally forward, as symbolized by the arrow 22. For the movement of the upper tool 12", 12'", the packaging machine according to the invention has two additional lifting devices 10. The movement of the lower tool 11 can be realized either with the lifting device 9 which is anyway present or with an additional lifting device 10.

Figure 6:
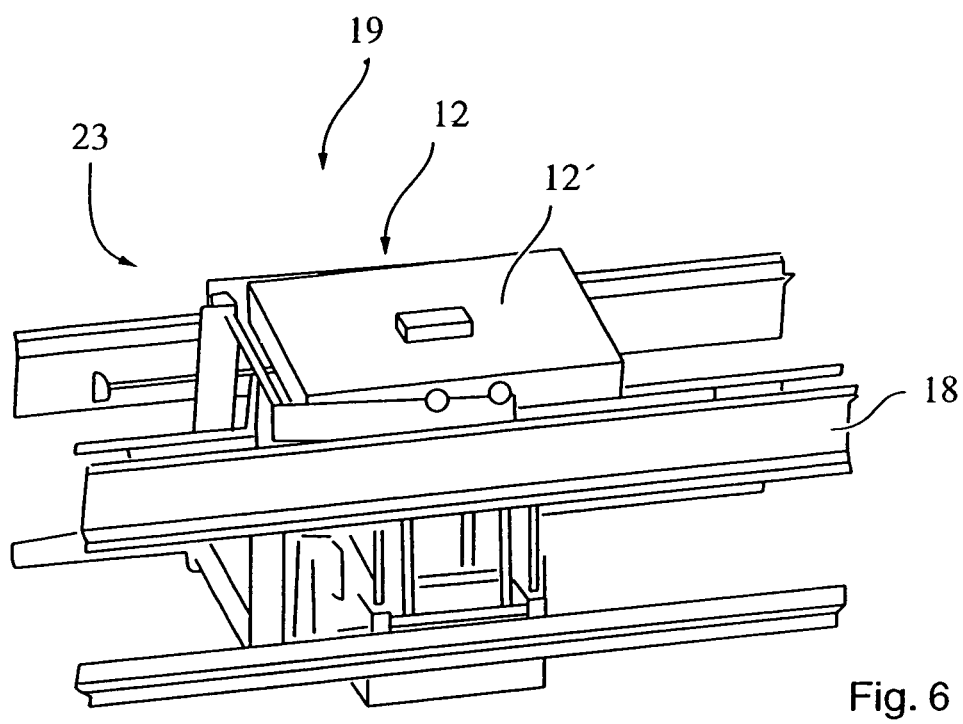
FIG. 6 shows the packaging machine with the supporting top part in the closed state.

FIG. 6 shows an embodiment of the packaging machine according to the invention in which the supporting top part 12' can be transferred with a pivot mechanism 23 from a horizontal into a vertical setting. As can be gleaned, in particular, from FIG. 7, the pivot mechanism 23 has a pivotable part 23', a part 23" provided fixedly on the machine frame 18, and a pivot joint 23'". The pivotable part 23' has connecting means 25, in this case rods, which can be detachably connected to the supporting top part 12'. Similarly, the supporting top part 12" has connecting means 26, which enable the pivotable part 23' to be coupled to the connecting means 25 thereof.

Figure 7:
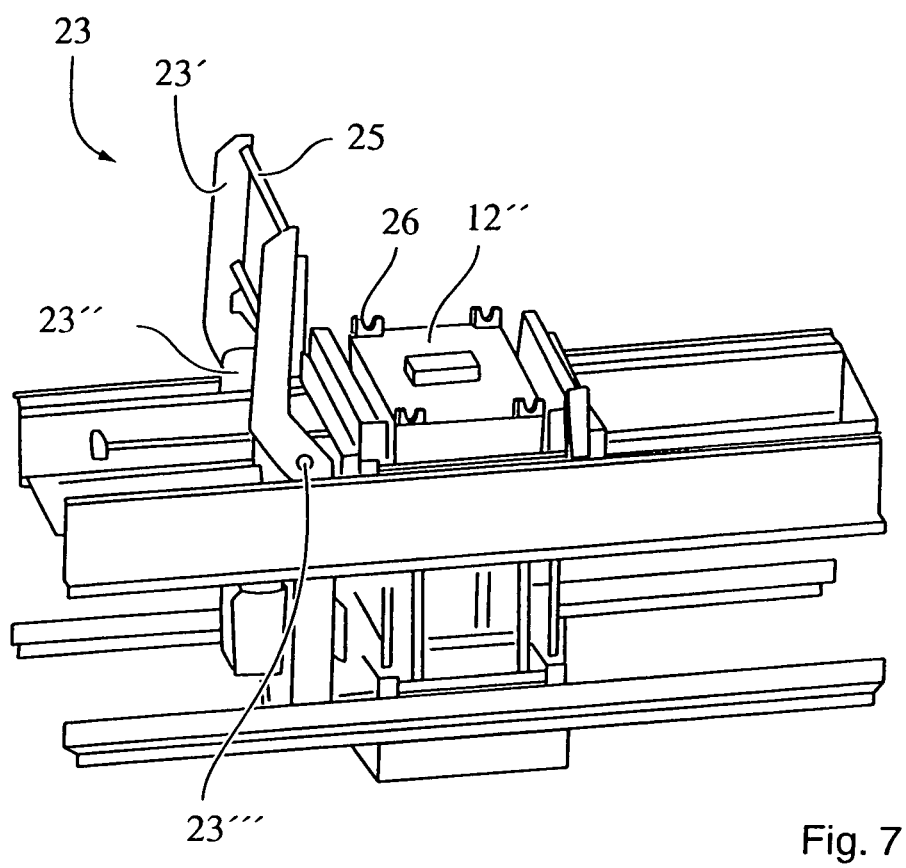
FIG. 7 shows the embodiment according to FIG. 6 with swung-up pivotable part, without the supporting top part being docked thereto.

In FIG. 7, the pivotable part 23' is represented in the swung-up state, without connection of the supporting top part 12'. In case the supporting top part 12' is connected, on the other hand, then this would be jointly swung up and the region above the tool 12" or 12'" would thus become freely accessible. The additional or sole embodiment in which the supporting top part can be laterally displaced in order to make the region above the tool 12" and 12'" freely accessible is not represented pictorially.

REFERENCE SYMBOL LIST 1 packaging machine
2 deep-drawing station
3 upper tool of the deep-drawing station
4 lower tool of the deep-drawing station
5 lifting table, bearer of the sealing and/or deep-drawing station, base plate on which the lower tool is fastened
6 pack trough
7 filling station
8 lower film web
9 lifting device for the packaging production and/or for the tool change
10 lifting device for the tool change
11 lower tool of the sealing station
12 upper tool of the sealing station
12' supporting top part, supporting sealing top part
12" further top part, sealing frame
12'" further top part, chamber cover
13 lifting table, bearer of the tool change system
14 upper film
15 parting plane
16 pack content
17 control element, control roller
18 machine frame
19 sealing station
20 film plane
21 lower disturbing edge
22 horizontal
23 pivot, rotary mechanism
23' pivotable part
23" fixed part
23'" pivot joint
24 inlet region
25 connecting means
26 connecting means
27 cutting device

The invention claimed is:

1. A method of deep-drawing or sealing a film web and changing an upper tool, a lower tool, or both in a packaging machine, the method includes:
   a. moving the lower tool up and down with a lifting device relative to the upper tool to deep draw or seal the film web,
   b. jointly raising the upper tool and the lower tool with the lifting device over a disturbing edge of the packaging machine and over a transport plane of a lower film web;
   c. removing the upper tool and the lower tool from the packaging machine, and
   d. delivering new tools above the disturbing edge to the packaging machine and above the transport plane of the lower film web,
wherein a supporting top part, for the tool change, is moved away from the upper tool.

2. The method as claimed in claim 1, wherein after the delivering step, the new tools are lowered in part or in full with the lifting device to below the disturbing edge.

3. The method as claimed in claim 1, wherein the method includes one or more steps of:
   raising the upper tool, the lower tool, or both, at least in sections, jointly, with at least one common drive,
   lowering the new tools, at least in sections, jointly, with the at least one common drive, and
   wherein the upper tool, the lower tool, or both are part of a sealing station, a forming station, or both.

4. The method as claimed in claim 1, wherein the lower tool is disposed on a lifting table and the upper tool is disposed on a supporting top part, the upper tool is locked to the supporting top part, and wherein the method includes one or more steps of:
   a. automatically unlocking the upper tool from the supporting top part, the lower tool from the lifting table, or both before changing the upper tool, the lower tool, or both,
   b. automatically locking a new upper tool to the supporting top part, a new lower tool to the lifting table, or both after the changing the upper tool, the lower tool, or both.

5. The method as claimed in claim 1, wherein the packaging machine includes at least one film web that is transported, wherein the method includes a step of:
   cutting a cutout in the at least one film web prior to jointly raising the upper tool and the lower tool so that the lower tool can be lifted through the cutout for the tool change.

6. A method of deep-drawing or sealing a film web and changing an upper tool, a lower tool, or both of a packaging machine, the method includes steps of:
   a. moving the lower tool up and down with a lifting device relative to the upper tool to deep draw or seal the film web,
   b. jointly raising the upper tool and the lower tool with the lifting device over a disturbing edge of the packaging machine and over a lower film web;
   c. removing the upper tool and the lower tool from the packaging machine, and
   d. delivering new tools above the disturbing edge to the packaging machine and above the lower film web,
wherein a supporting top part, for the tool change, is moved away, from the upper tool, and wherein during the step of jointly raising the upper tool and the lower tool, the lower tool is raised from an initial location below the disturbing edge.

7. The method as claimed in claim 6, wherein the method includes a step of changing a feed of a film web in a cycle, and during the step of changing the feed of the film web, only the upper tool, the lower tool, or both are changed.

8. The method as claimed in claim 6, wherein the method includes one or more steps of:
   raising the upper tool, the lower tool, or both at least in sections, jointly, with at least one common drive,
   lowering the new tools, as least in sections, jointly, with the at least one common drive, and
   wherein the upper tool, the lower tool or both are part of a sealing station, a forming station, or both.

9. A method of deep-drawing or sealing a film web and a tool change in a packaging machine, the method includes steps of:
   a. moving the lower tool up and down with a lifting device relative to the upper tool to deep draw or seal the film web,
   b. jointly raising an upper tool and a lower tool with the lifting device over a disturbing edge of the packaging machine and over a film web;
   c. removing the upper tool and the lower tool from the packaging machine, and
   d. delivering a new upper tool and a new lower tool above the disturbing edge and the film web to the packaging machine,
   e. changing a feed of the film web in a cycle when the upper tools, the lower tool, a base plate, or a combination thereof are changed, and
   f. cutting a cutout in the film web prior to jointly raising the upper tool and the lower tool so that the lower tool can be lifted through the cutout,
wherein during the step of jointly raising the upper tool and the lower tool, the lower tool is raised from an initial location, which is below the distributing edge.

10. The method as claimed in claim 9, wherein the method includes one or more steps of:
    lifting the base plate over the disturbing edge,
    lowering the base plate at least in sections below the disturbing edge after the tool change automatically unlocking the base plate before the tool change,
    automatically locking the base plate after the tool change.

11. The method as claimed in claim 9, wherein the packaging machine includes at least one film web that is transported, wherein the method includes a step of:
    cutting an opening in the at least one film web so that the lower tool can be lifted through the opening during changing of the lower tool, and
    wherein regions surrounding the opening in the at least one film web remain intact so that the at least one film web in some regions remains continuous.

12. A method of deep-drawing or sealing a film web and changing an upper tool, a lower tool, or both of a packaging machine, the method includes steps of:
    a. moving the lower tool up and down with a lifting device relative to the upper tool to deep draw or seal the film web,
    b. jointly raising the upper tool and the lower tool with the lifting device over a disturbing edge of the packaging machine and over a film,
    c. removing the upper tool and the lower tool from the packaging machine, and
    d. delivering new tools above the disturbing edge to the packaging machine and above the film,
wherein a position of a sealing station, a forming station, or both along the packaging machine is altered while changing the upper tool, the lower tool, or both.

13. The method as claimed in claim 12, wherein the method includes a step of identifying the upper tool, the lower tool, or both with RFID.

14. The method as claimed in claim 12, wherein the method includes a step of lifting and lowering the lower tool through a hole in the film.

15. The method as claimed in claim 12, wherein the tool change is realized without any additional assembly tool.

16. A packaging machine comprising: a deep-drawing station, a filling station, a sealing station, or a combination thereof, wherein the deep-drawing station, the sealing station, or both have a lower tool and an upper tool having at least one supporting top part, wherein the at least one supporting top part includes a pivot mechanism so that the at least one supporting top part can pivots, wherein the pivot mechanism is detachable from the at least one supporting top part, wherein the at least one supporting top part is movable away from the upper tool, and wherein the deep-drawing station, the sealing station, or both has a means for lifting the tools that, during a tool change, jointly raises the lower tool and the upper tool over a film and over a disturbing edge, which lies above a top edge of a machine frame, and jointly lowers the lower tool and the upper tool over the film and the disturbing edge.

17. The packaging machine as claimed in claim 16,
wherein the packaging machine has telescopic height-adjustable guide rails.

18. The packaging machine as claimed in claim 16, wherein the packaging machine has a plurality of deep-drawing stations, sealing stations, or both,
wherein the plurality of deep-drawing stations, sealing stations, or both each have respective upper tools and wherein the packaging machine has a product support that is designed to be height-adjustable, is part of a lifting device for the tool change, or both.

19. A packaging machine comprising: a deep-drawing station, a filling station, a sealing station, or a combination thereof, wherein the deep-drawing station, the sealing station, or both have a lower tool and an upper tool having at least one supporting top part, wherein the at least one supporting top part includes a pivot mechanism so that the at least one supporting top part can pivot, wherein the pivot mechanism is detachable from the at least one supporting top part, wherein the pivot mechanism is not integrated in the at least one supporting top part, but constitutes a separate, dockable assembly, and wherein the deep-drawing station, the sealing station, or both has a means for lifting the tools that, during a tool change, jointly raises the lower tool and the upper tool over a film and over a disturbing edge, which lies above a top edge of a machine frame, and lowers the lower tool, the upper tool, or both over the film and the disturbing edge.

20. The packaging machine as claimed in claim 19, wherein the packaging machine has a means that can be brought into engagement with a corresponding means on a transport means to define a position of the transport means relative to the packaging machine in at least two spatial directions;
wherein the transport means has holders for a tool and holders for the change tool for one or more stations, and
wherein the packaging machine has a power supply for the transport means.

* * * * *